(12) United States Patent
Varatharajan et al.

(10) Patent No.: US 12,249,932 B2
(45) Date of Patent: Mar. 11, 2025

(54) SYSTEM AND METHOD FOR CONTROLLING AN ELECTRIC MOTOR WITHOUT A POSITION SENSOR

(71) Applicant: Mitsubishi Electric Research Laboratories, Inc., Cambridge, MA (US)

(72) Inventors: Anantaram Varatharajan, Cambridge, MA (US); Yebin Wang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 186 days.

(21) Appl. No.: 18/063,895

(22) Filed: Dec. 9, 2022

(65) Prior Publication Data

US 2024/0195335 A1 Jun. 13, 2024

(51) Int. Cl.
*H02P 21/18* (2016.01)
*H02P 21/12* (2016.01)
(Continued)

(52) U.S. Cl.
CPC ............ *H02P 21/18* (2016.02); *H02P 21/12* (2013.01); *H02P 21/141* (2013.01); *H02P 21/20* (2016.02)

(58) Field of Classification Search
CPC .......... H02P 21/18; H02P 21/20; H02P 21/12; H02P 21/141; H02P 25/03
See application file for complete search history.

(56) References Cited

U.S. PATENT DOCUMENTS

| 10,658,955 B2* | 5/2020 | Lee ......................... H02P 25/03 |
| 2006/0091847 A1* | 5/2006 | Piippo ..................... H02P 21/18 |
| | | 318/721 |

(Continued)

FOREIGN PATENT DOCUMENTS

WO 2021/044325 A1 3/2021

OTHER PUBLICATIONS

Z. Lu, W. Wang, M. Cheng, W. Hua and C. Tang, "Voltage-Sensorless Model Predictive Current Control for Permanent-Magnet Synchronous Motor Drives," 2019 22nd International Conference on Electrical Machines and Systems (ICEMS), 2019, pp. 1-5, doi: 10.1109/ICEMS.2019.8921971.

(Continued)

*Primary Examiner* — Cortez M Cook
(74) *Attorney, Agent, or Firm* — Gene Vinokur

(57) ABSTRACT

The present disclosure discloses a controller and a method for controlling an electric motor. The controller comprises a feedback controller configured to generate a reference voltage vector, a hybrid flux observer configured to estimate a flux error vector based on a difference between a first stator flux linkage observed and a second stator flux linkage, and a position observer configured to estimate a position of a rotor of the electric motor based on a projection of the flux error vector in a direction orthogonal to a direction of a voltage error vector shifted with a phase of dynamics of the hybrid flux observer. The controller further comprises a state estimator configured to estimate a value of a state of operation of the electric motor based on the estimated position of the rotor, thereby closing a feedback control loop of the feedback controller.

17 Claims, 7 Drawing Sheets

(51) Int. Cl.
*H02P 21/14* (2016.01)
*H02P 21/20* (2016.01)

(56) References Cited

U.S. PATENT DOCUMENTS

2013/0175955 A1* 7/2013 Son .................... H02P 21/14
318/400.02
2023/0078403 A1* 3/2023 Liu .................... H02P 21/18
318/400.02

OTHER PUBLICATIONS

Yu-seok Jeong, S.-K. Sul, S. E. Schulz and N. R. Patel, "Fault detection and fault-tolerant control of interior permanent-magnet motor drive system for electric vehicle," in IEEE Transactions on Industry Applications, vol. 41, No. 1, pp. 46-51, Jan.-Feb. 2005, doi: 10.1109/TIA.2004.840947.

F. R. Salmasi, T. A. Najafabadi and P. J. Maralani, "An Adaptive Flux Observer With Online Estimation of DC-Link Voltage and Rotor Resistance for VSI-Based Induction Motors," in IEEE Transactions on Power Electronics, vol. 25, No. 5, pp. 1310-1319, May 2010, doi: 10.1109/TPEL.2009.2038268.

H. Tanaka, T. Ito and Y. Akita, "Fault Diagnosis Method of DC-Link Voltage Sensors in Inverter-Fed Motor Drive System for Steel Rolling Mill," The 10th International Conference on Power Electronics, Machines and Drives (PEMD 2020), 2020, pp. 873-878, doi: 10.1049/icp.2021.0961.

Q. Teng, J. Tian, J. Duan, H. Cui, J. Zhu and Y. Guo, "Sliding-mode MRA observer-based model predictive current control for PMSM drive system with DC-link voltage sensorless," 2017 20th International Conference on Electrical Machines and Systems (ICEMS), 2017, pp. 1-6, doi: 10.1109/ICEMS.2017.8056033.

S. K. Kommuri, S. B. Lee, Y. Park and K. C. Veluvolu, "A robust voltage, speed and current sensors fault-tolerant control in PMSM drives," IECON 2017—43rd Annual Conference of the IEEE Industrial Electronics Society, 2017, pp. 2937-2942, doi: 10.1109/IECON.2017.8216496.

W. Xu, L. Wang, Y. Liu and F. Blaabjerg, "Improved rotor flux observer for sensorless control of PMSM with adaptive harmonic elimination and phase compensation," in CES Transactions on Electrical Machines and Systems, vol. 3, No. 2, pp. 151-159, Jun. 2019, doi: 10.30941/CESTEMS.2019.00021. keywords: {Rotors;Observers;Couplings;Stators;Mathematical model;Harmonic analysis;Power harmonic filters;Improved phase-locked loop (IPLL);sensorless control;improved flux observer (IFO);self-adaptive band-pass filter (SABPF)}.

Nguyen, Trong Duy et al. "Modeling and Sensorless Direct Torque and Flux Control of a Dual-Airgap Axial Flux Permanent-Magnet Machine With Field-Weakening Operation." IEEE/ASME Transactions on Mechatronics 19 (2014): 412-422.

* cited by examiner

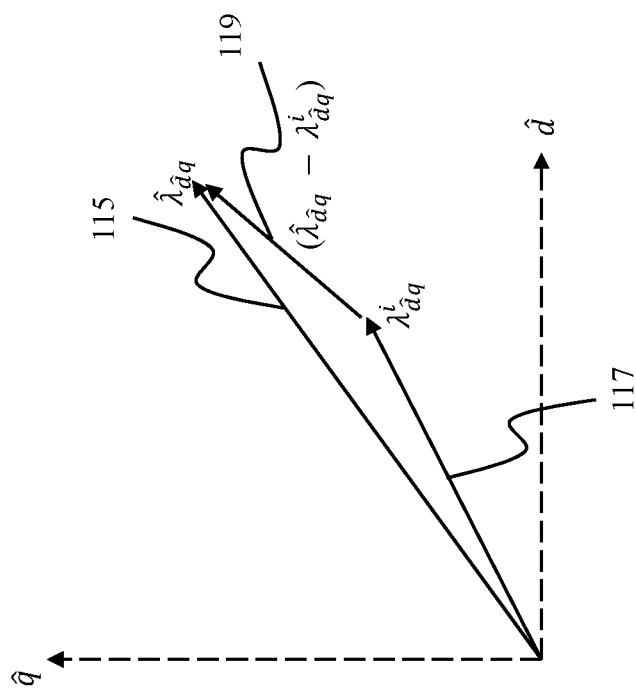

SYSTEM AND METHOD FOR CONTROLLING AN ELECTRIC MOTOR WITHOUT A POSITION SENSOR

TECHNICAL FIELD

The present disclosure relates generally to electric motors, and more particularly to a system and a method for controlling an electric motor without a position sensor.

BACKGROUND

An accurate and reliable DC-link voltage measurement is desired for normal operation of motor drives and, in particular, for position estimation of a rotor in the motor drives. The DC-link voltage may fluctuate due to various reasons. For example, DC-link capacitors are voluminous in size and down-sizing may be desirable for compactness of the motor drive, however, with diode-bridge passive front end, the downsizing leads to reduction in stiffness and oscillation in the DC-link voltage. Further, in battery powered servo-drive and propulsion applications, the DC-link voltage varies as a function of a battery state-of-charge.

To minimize impact of the DC-link voltage fluctuations, the DC-link voltage is measured using a DC-link voltage sensor and Pulse Width Modulation (PWM) duty cycles are generated accordingly. However, the DC-link voltage sensor may be subjected to temperature inflations, electromagnetic interference and other external factors, which hamper normal operation of the DC-link voltage sensor. As a result, the measured DC-link voltage is unreliable and inaccurate. In absence of the reliable and the accurate DC-link voltage measurement, a discrepancy between a reference voltage and an output inverter voltage occurs that manifests as torque error and ripples in the motor drives, adversely impacting a load of the motor drives. Further, in position sensorless motor drives, rotor position estimation techniques depend on an accuracy of flux estimation that is strongly coupled to the DC-link voltage measurement reliability. Thus, the estimation of the rotor position becomes inaccurate if the DC-link voltage measurement is unreliable/inaccurate.

Therefore, there is a need for a control technique for an electric motor that is independent and immune to errors in the DC-link voltage measurement.

SUMMARY

It is an objective of some embodiments to provide a system and a method for controlling an electric motor without a position sensor/transducer. It is also an objective of some embodiments to provide a position estimation method, which is immune to DC-link voltage measurements errors, for estimating a position of a rotor of the electric motor.

To achieve such objectives, the present disclosure provides a controller for estimating the position of the rotor and controlling the electric motor. The controller includes a feedback controller, a modulator, a Voltage Source Inverter (VSI), a hybrid flux observer, a position observer, and a state estimator. The VSI is powered by a DC voltage source. The electric motor may be powered by a DC voltage using the VSI. The feedback controller is configured to generate a reference voltage vector for the electric motor. The modulator is configured to generate duty cycles based on a DC-link voltage to modulate DC voltage according to the reference voltage vector such that a modulated voltage powering the electric motor reduces an error between a reference value of a state of an operation of the electric motor and a corresponding estimated value of the state of operation of the electric motor. The state of operation of the electric motor includes one or a combination of a speed of the electric motor, a position of a rotor of the electric motor, a torque of the electric motor, and a current of the electric motor.

The reference voltage vector and a measured current of the electric motor are input to the hybrid flux observer. The hybrid flux observer determines a first stator flux linkage based on a voltage model that is based on the reference voltage vector. The hybrid flux observer further determines a second stator flux linkage based on the measured current and a current-flux model of the electric motor. In particular, the current-flux model of the electric motor includes a look-up table of different values of the current of the electric motor and corresponding second stator flux linkages. The hybrid flux observer determines the second stator flux linkage corresponding to the measured current inputted to the hybrid flux observer, using the look-up table. Further, the hybrid flux observer estimates a flux error vector based on a difference between the first stator flux linkage and the second stator flux linkage.

Further, the flux error vector is input to the position observer. The position observer is configured to estimate the position of the rotor based on the flux error vector.

However, some embodiments are based on the recognition that, under DC-link voltage measurement errors, the estimation of the position of the rotor yields inaccurate position of the rotor. For instance, the DC-link voltage measurement error introduces a discrepancy between the reference voltage vector and an actual voltage vector and, consequently, the first stator flux linkage determined based on such reference voltage vector is also affected. Further, the flux error vector estimated based on such first stator flux linkage becomes inaccurate, leading to inaccurate estimation of the position of the rotor.

To that end, some embodiments aim to estimate the position of the rotor without being affected by the DC-link voltage measurement error. Some embodiments are based on the realization that, to estimate the position of the rotor without being affected by the DC-link voltage measurement error, the flux error vector can be projected in a direction orthogonal to a direction of a voltage error vector shifted with a phase of dynamics of the hybrid flux observer, and based on such projected flux error vector, the position of the rotor can be estimated.

The voltage error vector is a difference between the reference voltage vector and the actual voltage vector. The voltage error vector is a result of inaccurate duty cycles output of the modulator due to the DC-link voltage measurement error. The hybrid flux observer acts as an equivalent high-pass filter on the first stator flux linkage, where a hybrid flux observer feedback gain determines a cut-off frequency. To that end, the dynamics of the hybrid flux observer is represented as an equivalent high-pass filter action on the first stator flux linkage. To compensate for the high-pass filter action, the voltage error vector is phase shifted based on the hybrid flux observer feedback gain and an estimated operating speed to produce the resulting shifted voltage error vector.

Some embodiments are based on the realization that a component of the flux error vector that is orthogonal to the shifted voltage error vector is independent of the DC-link voltage measurement error. Thus, the flux error vector is projected along a direction orthogonal to the shifted voltage error vector to obtain a flux error that is scaled to obtain a position error signal Ee that is immune to the DC-link voltage measurement error.

Further, the position error signal is input to the position observer. The position observer estimates the position of the rotor based on the position error signal. The estimated position of the rotor is input to the state estimator. The state estimator is configured to estimate the value of the state of operation of the electric motor based on the estimated position of the rotor.

Some embodiments are based on further realization that, in addition to the rotor position estimation, a component $\in_v$ of the flux error vector along a direction of the shifted voltage error vector can be used for an accurate estimate of the DC-link voltage. To that end, a DC-link voltage observer that is configured to estimate the DC-link voltage based on a projection of the flux error vector in a direction of the shifted voltage error vector, is provided. The estimated DC-link voltage is input to the modulator to mitigate error in the duty cycles such that the actual voltage vector is identical to the reference voltage vector. The rotor position estimation is independent and decoupled from the DC link voltage estimation.

To that end, the controller provides both position sensorless operation and DC-link voltage sensorless operation capability for the electric motor.

Accordingly, one embodiment discloses a controller for controlling an electric motor powered by a DC voltage using a Voltage Source Inverter (VSI). The controller comprises a feedback controller configured to generate a reference voltage vector for the electric motor; a modulator configured to generate duty cycles based on a DC link voltage to modulate the DC voltage according to the reference voltage vector such that a modulated voltage powering the electric motor reduces an error between a reference value of a state of an operation of the electric motor and a corresponding estimated value of the state of operation of the electric motor; a hybrid flux observer configured to estimate a flux error vector based on a difference between a first stator flux linkage observed according to a voltage model based on the reference voltage vector and a second stator flux linkage determined according to a current-flux model of the electric motor; a position observer configured to estimate a position of a rotor of the electric motor based on a projection of the flux error vector in a direction orthogonal to a direction of a voltage error vector shifted with a phase of dynamics of the hybrid flux observer; and a state estimator configured to estimate the value of the state of operation of the electric motor based on the estimated position of the rotor, thereby closing a feedback control loop of the feedback controller.

Accordingly, another embodiment discloses a method for controlling an electric motor powered by a DC voltage using a Voltage Source Inverter (VSI). The method comprises generating a reference voltage vector for the electric motor; generating duty cycles based on a DC link voltage to modulate the DC voltage according to the reference voltage vector such that a modulated voltage powering the electric motor reduces an error between a reference value of a state of an operation of the electric motor and a corresponding estimated value of the state of operation of the electric motor; estimating a flux error vector based on a difference between a first stator flux linkage observed according to a voltage model based on the reference voltage vector and a second stator flux linkage determined according to a current-flux model of the electric motor; estimating a position of a rotor of the electric motor based on a projection of the flux error vector in a direction orthogonal to a direction of a voltage error vector shifted with a phase of dynamics of the hybrid flux observer; and estimating the value of the state of operation of the electric motor based on the estimated position of the rotor.

Accordingly, yet another embodiment discloses a non-transitory computer-readable storage medium embodied thereon a program executable by a processor for performing a method for controlling an electric motor powered by a DC voltage using a Voltage Source Inverter (VSI). The method comprises generating a reference voltage vector for the electric motor; generating duty cycles based on a DC link voltage to modulate the DC voltage according to the reference voltage vector such that a modulated voltage powering the electric motor reduces an error between a reference value of a state of an operation of the electric motor and a corresponding estimated value of the state of operation of the electric motor; estimating a flux error vector based on a difference between a first stator flux linkage observed according to a voltage model based on the reference voltage vector and a second stator flux linkage determined according to a current-flux model of the electric motor; estimating a position of a rotor of the electric motor based on a projection of the flux error vector in a direction orthogonal to a direction of a voltage error vector shifted with a phase of dynamics of the hybrid flux observer; and estimating the value of the state of operation of the electric motor based on the estimated position of the rotor.

BRIEF DESCRIPTION OF THE DRAWINGS

FIG. 1B illustrates a vector representation of a first stator flux linkage, a second stator flux linkage, and a flux error vector, in coordinates $\hat{d}$, $\hat{q}$ of estimated rotor reference frame, according to some embodiments of the present disclosure.

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
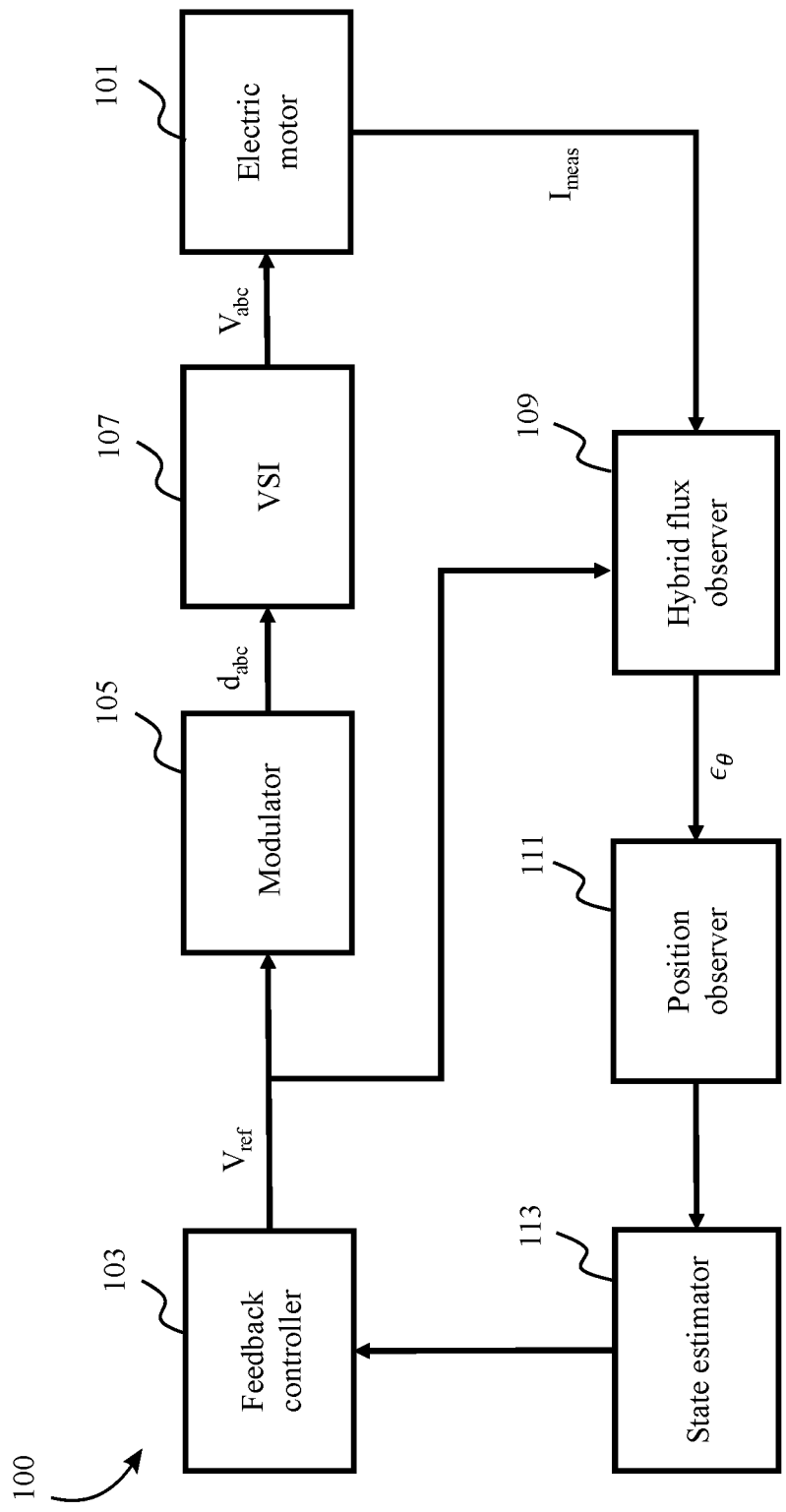
FIG. 1A illustrates a block diagram of a controller for controlling an electric motor, according to some embodiments of the present disclosure.

FIG. 1A shows a block diagram of a controller 100 for controlling an electric motor 101, according to some embodiments of the present disclosure. The controller 100 includes a feedback controller 103, a modulator 105, a Voltage Source Inverter (VSI) 107, a hybrid flux observer 109, a position observer 111, and a state estimator 113. The electric motor 101 may be a synchronous motor which is an AC electric motor in which, at steady state, rotation of its shaft is synchronized with frequency of supply current. Examples of synchronized motors include reluctance and permanent magnet motors. The VSI 107 is powered by a DC voltage source. The electric motor 101 may be powered by a DC voltage using the VSI 107.

The feedback controller 103 is configured to generate a reference voltage vector ($V_{ref}$) for the electric motor 101. The modulator 105 is configured to generate duty cycles ($d_{abc}$) based on a DC-link voltage to modulate DC voltage according to the reference voltage vector such that a modulated voltage powering the electric motor 101 reduces an error between a reference value of a state of an operation of the electric motor 101 and a corresponding estimated value of the state of operation of the electric motor 101. The state of operation of the electric motor 101 includes one or a combination of a speed of the electric motor 101, a position of a rotor of the electric motor 101, a torque of the electric motor 101, and a current of the electric motor 101.

The reference voltage vector ($V_{ref}$) and a measured current ($I_{meas}$) of the electric motor 101 are input to the hybrid flux observer 109. The hybrid flux observer 109 determines a first stator flux linkage based on a voltage model that is based on the reference voltage vector. The hybrid flux observer 109 further determines a second stator flux linkage based on the measured current and a current-flux model of the electric motor 101. In particular, the current-flux model of the electric motor 101 includes a look-up table of different values of the current of the electric motor 101 and corresponding second stator flux linkages. The hybrid flux observer 109 determines the second stator flux linkage corresponding to the measured current inputted to the hybrid flux observer 109, using the look-up table. Further, the hybrid flux observer 109 estimates a flux error vector based on a difference between the first stator flux linkage and the second stator flux linkage.

FIG. 1B shows a vector representation of a first stator flux linkage ($\hat{\lambda}_{\hat{d}q}$) 115, a second stator flux linkage ($\hat{\lambda}_{\hat{d}q}^i$) 117, and a flux error vector ($\hat{\lambda}_{\hat{d}q} - \hat{\lambda}_{\hat{d}q}^i$) 119, in coordinates $\hat{d}$, $\hat{q}$ of estimated rotor reference frame, according to some embodiments.

Further, the flux error vector 119 is input to the position observer 111. The position observer 111 is configured to estimate the position of the rotor based on the flux error vector 119.

However, some embodiments are based on the recognition that, under DC-link voltage measurement errors, the estimation of the position of the rotor yields inaccurate position of the rotor. For instance, the DC-link voltage measurement error introduces a discrepancy between the reference voltage vector and an actual voltage vector ($V_{abc}$) and, consequently, the first stator flux linkage determined based on such reference voltage vector is also affected. Further, the flux error vector estimated based on such first stator flux linkage becomes inaccurate, leading to inaccurate estimation of the position of the rotor.

To that end, some embodiments aim to estimate the position of the rotor without being affected by the DC-link voltage measurement error. Some embodiments are based on the realization that, to estimate the position of the rotor without being affected by the DC-link voltage measurement error, the flux error vector 119 can be projected in a direction orthogonal to a direction of a voltage error vector shifted with a phase of dynamics of the hybrid flux observer 109, and based on such projected flux error vector, the position of the rotor can be estimated. Such a projection of the flux error vector 119 is described in FIG. 1C.

Figure 1C:
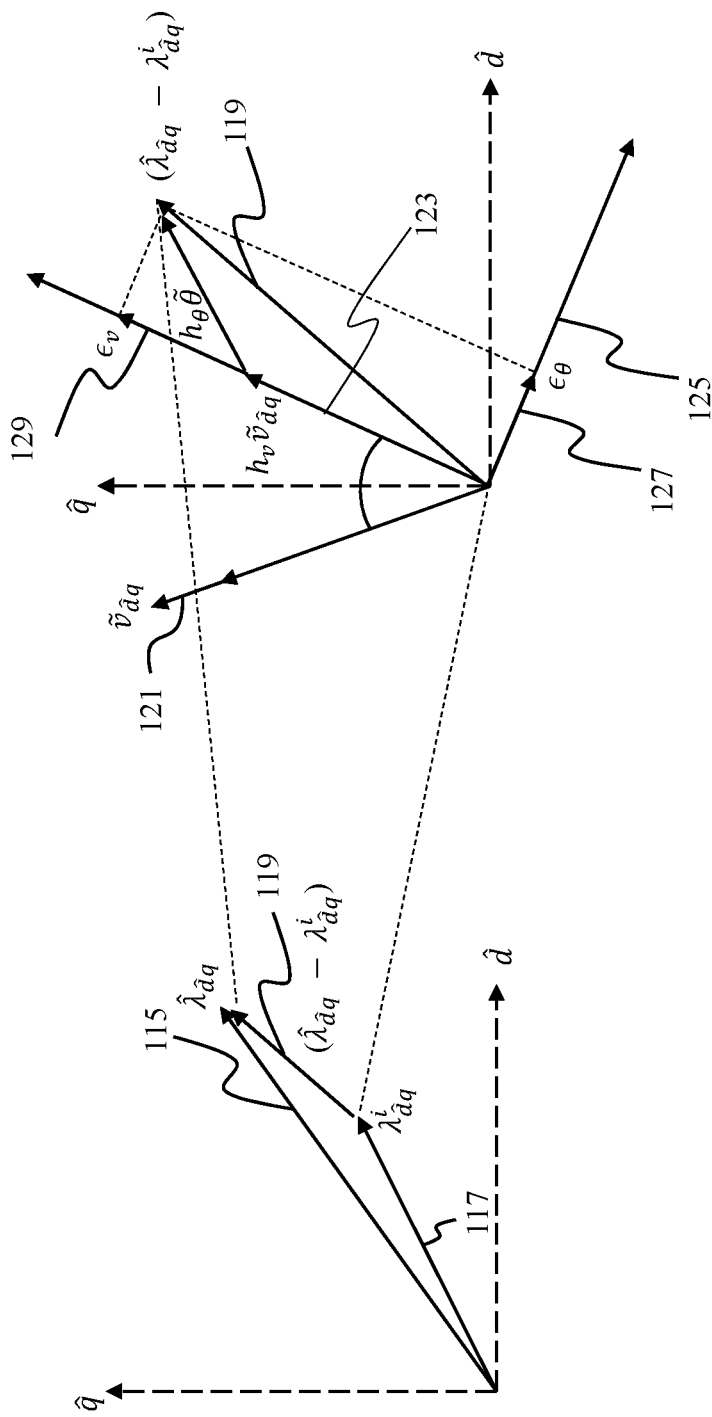
FIG. 1C illustrates a projection of a flux error vector in a direction orthogonal to a direction of a voltage error vector shifted with a phase of dynamics of a hybrid flux observer, according to some embodiments of the present disclosure.

Referring to FIG. 1C, a voltage error vector ($\tilde{v}_{\hat{d}q}$) 121 is shifted with a phase of dynamics of the hybrid flux observer 109 to produce a shifted voltage error vector 123. The voltage error vector 121 is a difference between the reference voltage vector and the actual voltage vector. The voltage error vector 121 is a result of inaccurate duty cycles ($d_{abc}$) output of the modulator 105 due to the DC-link voltage measurement error. The hybrid flux observer 109 acts as an equivalent high-pass filter on the first stator flux linkage, where a hybrid flux observer feedback gain determines a cut-off frequency. To that end, the dynamics of the hybrid flux observer is represented as an equivalent high-pass filter action on the first stator flux linkage. To compensate for the high-pass filter action, the voltage error vector 121 is phase shifted based on the hybrid flux observer feedback gain and an estimated operating speed of the electric motor 101 to produce the shifted voltage error vector 123.

Some embodiments are based on the realization that a component of the flux error vector 119 that is orthogonal to the shifted voltage error vector 123 is independent of the DC-link voltage measurement error. Thus, the flux error vector 119 is projected along a direction 125 orthogonal to the shifted voltage error vector 123 to obtain a flux error that is scaled to obtain a position error signal ($\in_\theta$) 127 that is immune to the DC-link voltage measurement error.

Further, the f position error signal 127 is input to the position observer 111. The position observer 111 estimates the position of the rotor based on the position error signal 127. The estimated position of the rotor is input to the state estimator 113. The state estimator 113 is configured to estimate the value of the state of operation of the electric motor 101 based on the estimated position of the rotor.

Figure 1D:
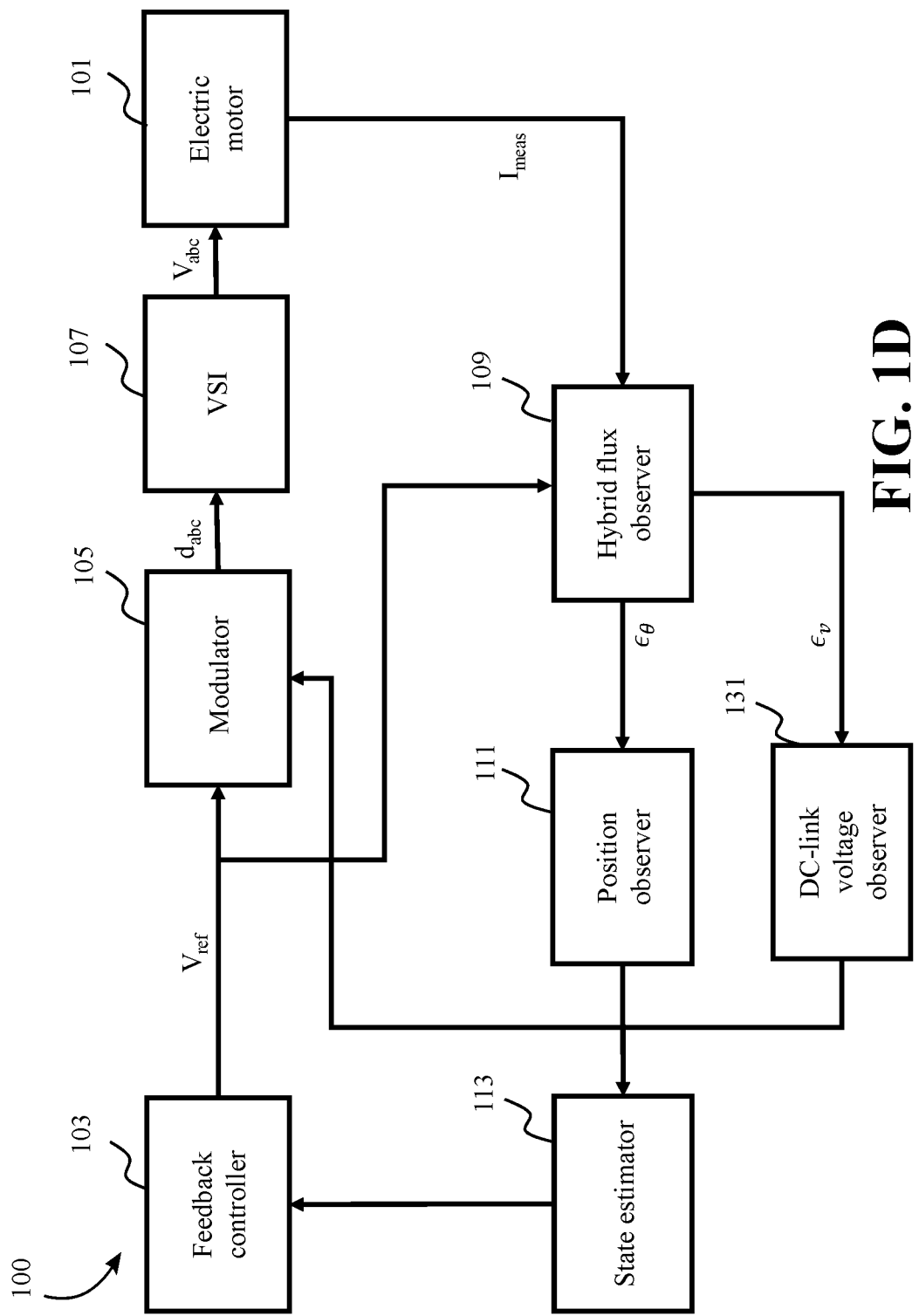
FIG. 1D illustrates a block diagram of the controller including a DC-link voltage observer, according to some embodiments of the present disclosure.

Some embodiments are based on further realization that, in addition to the rotor position estimation, a component ($\in_v$) 129 of the flux error vector 119 along a direction of the shifted voltage error vector 123 can be used for an accurate estimate of the DC-link voltage. To that end, a DC-link voltage observer 131 that is configured to estimate the DC-link voltage based on a projection of the flux error vector 119 in a direction of the shifted voltage error vector 123, is provided as shown in FIG. 1D. The estimated DC-link voltage is input to the modulator 105 to mitigate error in the duty cycles such that the actual voltage vector is identical to the reference voltage vector. The rotor position estimation is independent and decoupled from the DC link voltage estimation.

To that end, the controller 100 provides both position sensorless operation and DC-link voltage sensorless operation capability for the electric motor 101.

Figure 2A:
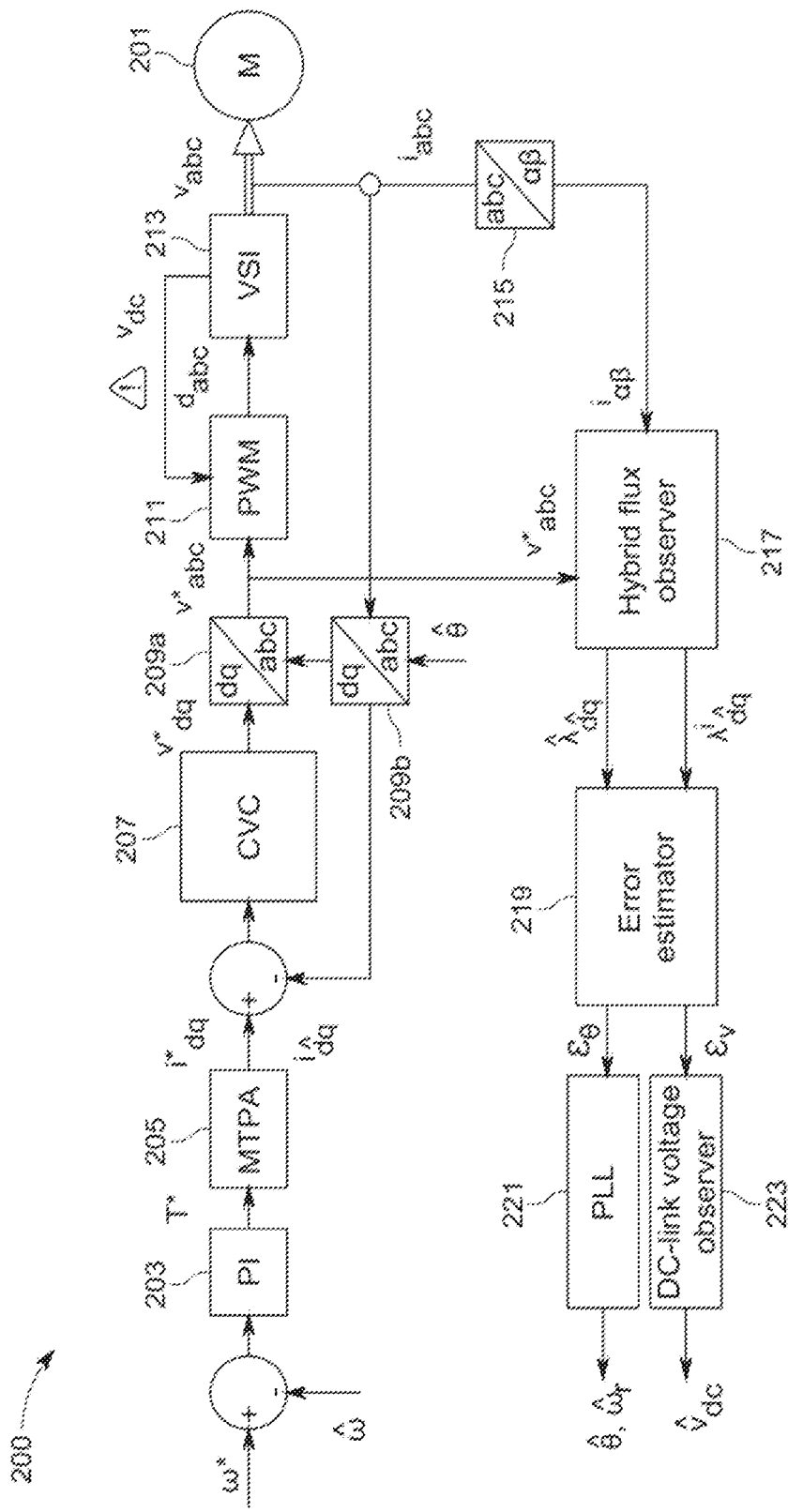
FIG. 2A shows a detailed implementation of a controller for controlling the electric motor, according to some other embodiments of the present disclosure.

FIG. 2A shows a detailed implementation of a controller 200 for controlling an electric motor 201, according to some other embodiments of the present disclosure. The controller 200 includes a proportional-integral (PI) controller 203 (which is a feedback controller), a maximum-torque-per-ampere (MTPA) 205, a Current-Vector-Controller (CVC) 207, dq-abc converters 209a and 209b, a Pulse Width Modulator (PWM) 211, a Voltage Source Inverter (VSI) 213, abc-αβ converter 215, a hybrid flux observer 217, an error estimator 219, a Phase-Locked-Loop (PLL) 221, and a DC-link voltage observer 223.

A rotor position is denoted by θ and an electrical angular speed is ω=s θ where s is a differential operator $$\frac{d}{dt}.$$

Estimated vectors are represented by superscript (^), called "hat". An orthogonal rotational matrix is $$J = \begin{bmatrix} 0 & -1 \\ 1 & 0 \end{bmatrix}$$

and I is an identity matrix. A model of the electric motor 201 is expressed in coordinates of an estimated rotor reference frame, denoted by subscript $\hat{d}q$, whose $\hat{d}$-axis is at $\hat{\theta}=\theta-\tilde{\theta}$, where $\tilde{\theta}$ is an position error. Real space vectors are used, for example, a stator current is $i_{\hat{d}q}=[i_{\hat{d}}, i_{\hat{q}}]^T$ where $i_{\hat{d}}$ and $i_{\hat{q}}$ are vector components in the estimated rotor reference frame. Space vectors in a stationary reference frame are denoted by subscript αβ. For the purpose of explanation, convention of a synchronous reluctance (SyR) machine is followed, i.e, d-axis is defined along the maximum inductance path.

The PI controller 203 regulates an estimated speed $\hat{\omega}$ to a reference speed ω* (user input) through a reference torque T*. Alternatively, a user can directly input the reference torque for applications where outer speed control is not necessary (e.g., traction applications). The reference torque is translated to a current vector reference i*$_{\hat{d}q}$ in rotating dq reference frame such that MTPA 205 condition is satisfied, to minimize copper losses in the electric motor 201 and improve efficiency. A measured three-phase current i$_{abc}$ is transformed to coordinates of the estimated rotor reference frame, i.e., i$_{\hat{d}q}$, using an estimated rotor position $\hat{\theta}$ with the dq-abc converter 209b. The dq-abc converter 209b may, for example, use Clarke and Park transformations. The CVC 207 generates a reference voltage v*$_{\hat{d}q}$ in the rotating dq coordinates based on i$_{abc}$ and i$_{\hat{d}q}$. The reference voltage v*$_{\hat{d}q}$ is transformed to a three-phase reference voltage v*$_{abc}$, using the dq-abc converter 209a.

The three-phase reference voltage v*$_{abc}$ is fed to the PWM 211. The PWM 211 generates duty cycles d$_{abc}$ for the given v*$_{abc}$, based on a measured DC-link voltage v$_{dc}$. The VSI 213 controls the electric motor 201 based on the duty cycles d$_{abc}$. The measured three-phase current i$_{abc}$ is transformed into a current i$_{αβ}$ in the stationary reference frame using the abc-αβ converter 215. The three-phase reference voltage v*$_{abc}$ and the current i$_{αβ}$ are input to the hybrid flux observer 217. The hybrid flux observer 217 estimates the first stator flux linkage $\hat{\lambda}_{\hat{d}q}$ according to the voltage model (back-emf integration) and the second stator flux linkage $\hat{\lambda}_{\hat{d}q}{}^i$ according to a current-flux model of the electric motor 201. The current-flux model of the electric motor 201 includes a look-up table of different values of the current of the electric motor 201 and corresponding second stator flux linkages.

Figure 2B:
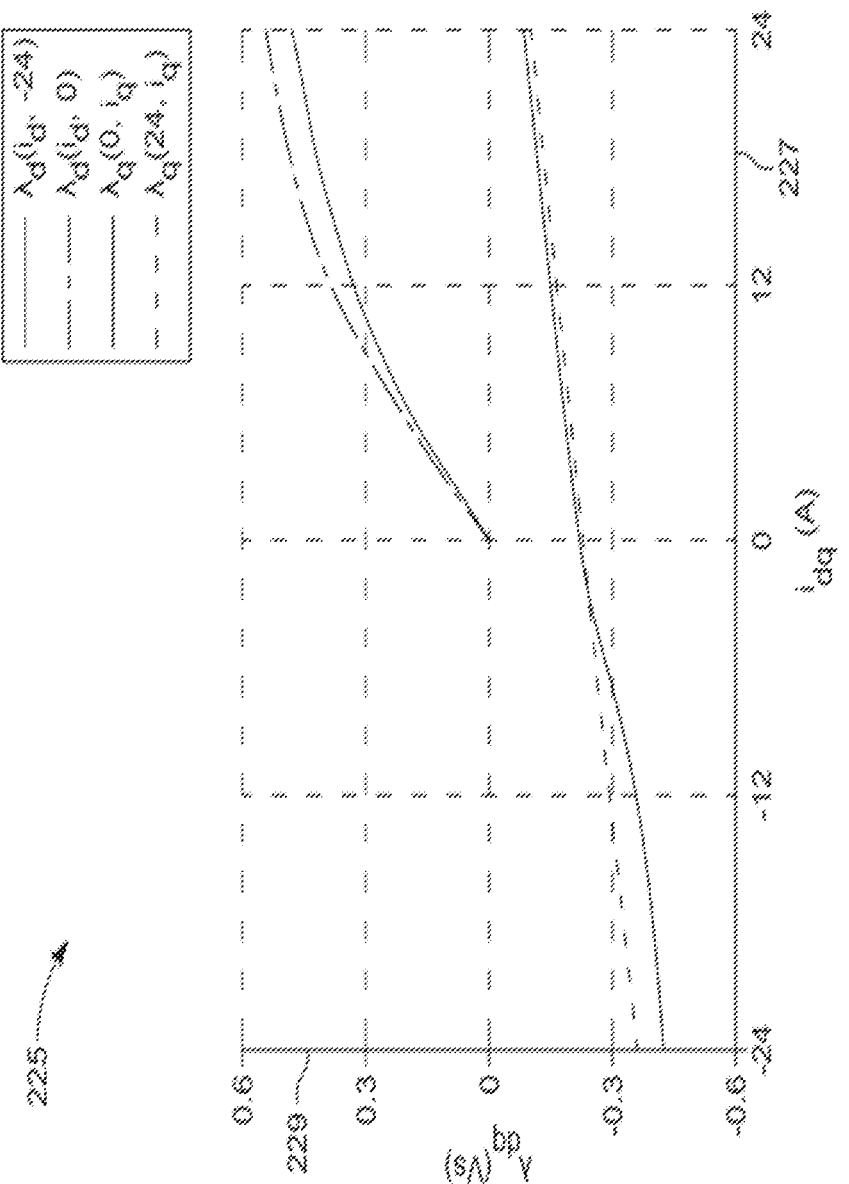
FIG. 2B illustrates a look-up table of different values of a current of the electric motor and corresponding second stator flux linkages, according to some embodiments of the present disclosure.

FIG. 2B illustrates a look-up table 225, according to some embodiments of the present disclosure. The look-up table 225 is a plot between a current 227 of the electric motor 201 and a stator flux linkage 229. The hybrid flux observer 217 determines the second stator flux linkage corresponding to value of the current i$_{αβ}$, using the look-up table 225.

The first stator flux linkage $\hat{\lambda}_{\hat{d}q}$ and the second stator flux linkage $\hat{\lambda}_{\hat{d}q}{}^i$ are input to the error estimator 219. The error estimator 219 determines a flux error that is scaled to obtain a position error signal $\epsilon_\theta$ based on a projection of a flux error vector in a direction orthogonal to a direction of a voltage error vector shifted with a phase of dynamics of the hybrid flux observer 217. The flux error vector is a difference between the first stator flux linkage $\hat{\lambda}_{\hat{d}q}$ and the second stator flux linkage $\hat{\lambda}_{\hat{d}q}{}^i$. The position error signal $\epsilon_\theta$ is input to the PLL 221 tracking a rotor position of the electric motor 201. The PLL 221 estimates rotor position and speed of the electric motor 201, thereby closing control loop of the controller 200. Such an estimation of the rotor position is independent and immune to the DC-link voltage measurement error.

Additionally or alternatively, the error estimator 219 determines a flux error that is scaled to obtain a voltage error signal $\epsilon_v$ based on a projection of the flux error vector in a direction of the voltage error vector shifted with the phase of dynamics of the hybrid flux observer 217. The voltage error signal $\epsilon_v$ is input to the DC-link voltage observer 223. Based on $\epsilon_v$, the DC-link voltage observer 223 estimates a DC-link voltage $\hat{v}_{dc}$.

In some embodiments, the electric motor 201 is a synchronous machine. A voltage equation of the synchronous machine in the estimated rotor reference frame is given by $$s\hat{\lambda}_{\hat{d}q}=v_{\hat{d}q}-R_s i_{\hat{d}q}-\hat{\omega}J\hat{\lambda}_{\hat{d}q} \quad (1)$$

where R$_s$ is a stator resistance and $\hat{\lambda}_{\hat{d}q}$ is a stator flux linkage. The synchronous machine exhibits nonlinear magnetic characteristics due to both saturation and cross-saturation phenomenon. Equivalently, nonlinear stator flux linkage can be expressed as an operating point dependent linear magnetic model as $$\hat{\lambda}_{\hat{d}q}=e^{J\tilde{\theta}}L(i_{dq})e^{-J\tilde{\theta}}i_{\hat{d}q}+e^{J\tilde{\theta}}\lambda_m \quad (2)$$

where an apparent inductance matrix L is a function of an operating point i$_{dq}$ in real dq rotor reference frame and $\lambda_m$ is an open circuit permanent-magnet flux linkage vector. The apparent inductance matrix L is given by $$L(i_{dq}) = \begin{bmatrix} L_d & 0 \\ 0 & L_q \end{bmatrix} \quad (3)$$

$$\lambda_m = \begin{bmatrix} 0 \\ -\lambda_m \end{bmatrix}$$

where $\lambda_m$ is the open circuit permanent-magnet flux linkage and L$_d$, L$_q$ are apparent inductances along d and q-axis, respectively. An average electromagnetic torque is given by $$T = \frac{3p}{2}i_{dq}^T J\lambda_{\hat{d}q} \quad (4)$$

where p is a number of pole pairs.

The hybrid flux observer 217 is a combination of the back-emf integral (voltage-model) and the current-flux model, defined in the stationary reference frame as $$s\hat{\lambda}_{\alpha\beta} = \hat{v}_{\alpha\beta} - R_s i_{\alpha\beta} + e^{j\hat{\theta}} G(\lambda_{\hat{d}q}{}^i - \hat{\lambda}_{\hat{d}q}) \quad (5)$$

where G is a 2×2 gain matrix and $\lambda_{\hat{d}q}{}^i$ is the stator flux linkage based on the current-flux model. In the present disclosure, accurate parameters are assumed, i.e., $\lambda_{dq}{}^i = \lambda_{dq}$.

Figure 2C:
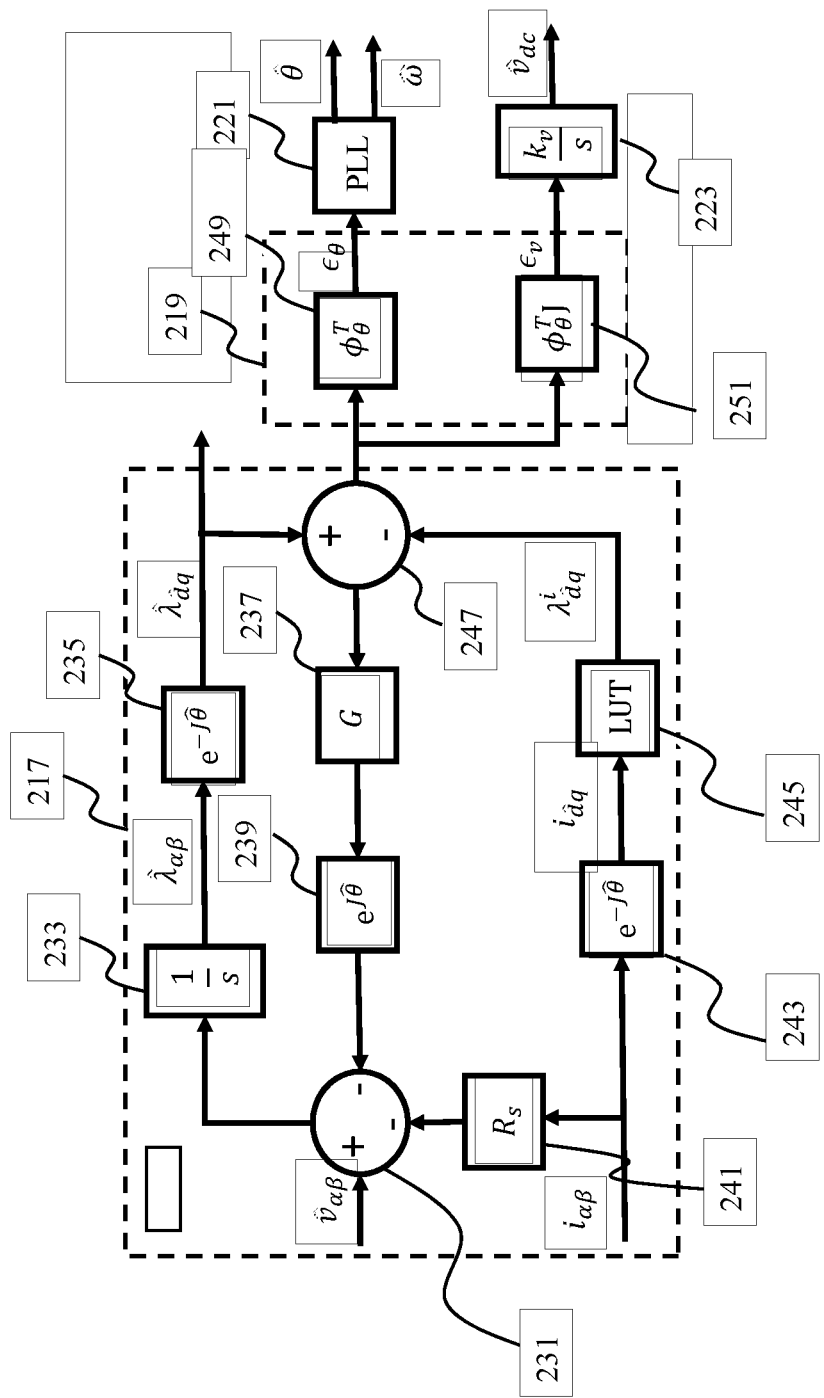
FIG. 2C shows a block diagram of a hybrid flux observer and an error estimator, according to some embodiments of the present disclosure.

FIG. 2C shows a block diagram of the hybrid flux observer 217 and the error estimator 219, according to some embodiments of the present disclosure. The state equation (5) is realized in 231 by removing a stator resistance voltage drop 241 and a flux error vector 247 that is scaled by a feedback gain 237 and transformed to stationary coordinates using inverse park transform 239. An integrator 233 outputs an estimated first stator flux linkage $\hat{\lambda}_{\alpha\beta}$ in the stationary coordinates that is transformed to the first stator flux linkage $\hat{\lambda}_{\hat{d}q}$ in the estimated rotor reference frame using park transform 235. Measured current $i_{\alpha\beta}$ is transformed to a current $i_{\hat{d}q}$ in the rotating reference frame using park transformation 243. Further, based on LUT 245 (i.e., the current-flux model), the second stator flux linkage $\hat{\lambda}_{\hat{d}q}{}^i$ is determined. The flux error vector 247 is obtained from the first stator flux linkage $\hat{\lambda}_{\hat{d}q}$ and the second stator flux linkage $\hat{\lambda}_{\hat{d}q}{}^i$. The flux error vector is projected along a direction 249 to obtain the position error signal $\in_\theta$ which is the input to the PPL 221. In addition, the flux error vector is projected along a direction 251 to obtain the voltage error signal $\in_v$ which is used to estimate the DC-link voltage with DC-link voltage observer 223 which is an integral controller.

For analysis purposes, state equation is transformed to synchronous reference frame as $$s\hat{\lambda}_{\hat{d}q} = \hat{v}_{\hat{d}q} - R_s i_{\hat{d}q} - \omega J\hat{\lambda}_{\hat{d}q} + G(\lambda_{\hat{d}q}{}^i - \hat{\lambda}_{\hat{d}q}) \quad (6)$$

where $\tilde{v}_{\hat{d}q} = v_{\hat{d}q} - \hat{v}_{\hat{d}q}$ is a voltage error. The error in the DC-link voltage appears as a scalar gain on a fundamental voltage and is related to the voltage error as $$\tilde{v}_{\hat{d}q} = v_{\hat{d}q} \tilde{v}_{dc} \quad (7)$$

where $\tilde{v}_{dc} = (v_{dc} - \hat{v}_{dc})/v_{dc,n}$ is a relative error and $v_{dc,n}$ is a nominal voltage.

A relationship between the real stator flux $\lambda_{\hat{d}q}$ and $\lambda_{\hat{d}q}{}^i$ in the estimated rotor reference frame is formulated by linearizing the stator flux linkage around an operating point as $$\lambda_{\hat{d}q}(i_{\hat{d}q}) = e^{J\tilde{\theta}}\lambda_{dq}\left(e^{-J\tilde{\theta}}i_{\hat{d}q}\right) \approx (I + \tilde{\theta}J)\left(\lambda_{dq}\left(i_{\hat{d}q}\right) - \tilde{\theta}\frac{\partial\lambda_{dq}}{\partial i_{\hat{d}q}}Ji_{\hat{d}q}\right) \quad (8)$$

Time derivative of the stator flux linkage can be expressed with an incremental inductance matrix $L_\partial$ as $$\frac{\partial\lambda_{dq}}{\partial i_{dq}} = L_\partial(i_{dq}) = \begin{bmatrix} l_d & l_{dq} \\ l_{dq} & l_q \end{bmatrix} \quad (9)$$

where $l_d$, $l_q$ represents d and q-axis incremental inductance, respectively, and $l_{dq}$ is a cross-saturation term. A first order approximation holds for small position error, i.e., a constant incremental inductance in the vicinity of the operating point is assumed. Simplifying (8), a magnetic model accounting position error (MMAP) is derived as $$\lambda_{\hat{d}q} = \lambda_{\hat{d}q}{}^i + \tilde{\theta}\lambda_{\hat{d}q}{}^a \quad (10)$$

where an auxiliary-flux vector $\lambda_{\hat{d}q}{}^a$ for nonlinear magnetic model is given by $$\lambda_{\hat{d}q}{}^a = J\lambda_{\hat{d}q}{}^i - L_\partial J i_{\hat{d}q}. \quad (11)$$

To aid in further analysis, nonlinear flux estimation error dynamics is derived from (1) and (6) as $$s\tilde{\lambda}_{\hat{d}q} = \tilde{v}_{\hat{d}q} - (G + \omega J)\tilde{\lambda}_{\hat{d}q} + G(\lambda_{\hat{d}q} - \lambda_{\hat{d}q}{}^i) \quad (12)$$

where $\tilde{\lambda}_{\hat{d}q} = \lambda_{\hat{d}q} - \hat{\lambda}_{\hat{d}q}$ is the flux error vector. Using MMAP (10) in (12), linearized flux estimation error dynamics as a function of position error is given by $$\tilde{\lambda}_{\hat{d}q} = (sI + G + \omega J)^{-1}(\tilde{v}_{\hat{d}q} + G\lambda_{\hat{d}q}{}^a \tilde{\theta}). \quad (13)$$

Further, (13) may be used to formulate a position error signal.

A generalized error signal e driving an observer adaptation law is expressed as a projection of difference $(\hat{\lambda}_{\hat{d}q} - \lambda_{\hat{d}q}{}^i)$ on a projection vector $\phi$ as $$\in = \phi^T(\hat{\lambda}_{\hat{d}q} - \lambda_{\hat{d}q}{}^i). \quad (14)$$

A linearized form the error signal is derived using (10) as $$\in = \phi^T(\hat{\lambda}_{\hat{d}q}{}^a\tilde{\theta} - \tilde{\lambda}_{\hat{d}q}). \quad (15)$$

Following the results of the flux estimation error dynamics (13), the error signal (15) is decomposed in terms of constituent errors as $$\in = \phi^T[h_\theta h_v]\tilde{x} \quad (16)$$

$$h_\theta = (sI + G + \omega J)^{-1}(sI + \omega J)\hat{\lambda}_{\hat{d}q}{}^a$$

$$h_v = -(sI + G + \omega J)^{-1}\tilde{v}_{\hat{d}q} \quad (17)$$

where $\tilde{x} = [\tilde{\theta}\ \tilde{v}_{dc}]^T$. Transfer function matrices $h_\theta$ and $h_v$ are of length 2×1.

Let $\phi_\theta$ be a position error projection vector (2×1) and $\in_\theta$ be the position error signal (1×1). The position error projection vector $\phi_\theta$ is designed to be immune from the DC-link voltage error in steady-state as $$\phi_\theta^T h_v|_{s=0} = 0\phi_\theta^T(G + \omega J)^{-1}\tilde{v}_{\hat{d}q} = 0. \quad (18)$$

Also, a unitary open-loop dc-gain (steady-state) of position estimation loop is desired, i.e., $$\phi_\theta^T h_\theta|_{s=0} = \phi_\theta^T(G + \omega J)^{-1}\omega J\hat{\lambda}_{\hat{d}q}{}^a = 1. \quad (19)$$

The preceding two conditions are satisfied with a projection vector of nature:

$$\phi_\theta^T = \frac{-1}{\omega v_{\hat{d}q}^T \hat{\lambda}_{\hat{d}q}^a}\hat{v}_{\hat{d}q}^T J(G + \omega J). \quad (20)$$

The PLL 221 with the PI controller 203 is employed to drive the position error signal $\in_\theta$ to zero as $$\hat{\omega} = k_p \in_\theta + \omega_i,\ \omega_i = \int k_i \in_\theta dt\ \hat{\theta} = \int \omega dt \quad (21)$$

where $k_p$ and $k_i$ are respective gains. Gains of the PLL 221 are tuned for a critically damped response considering $\in_\theta = \tilde{\theta}$ at $s = -\Omega_\omega$ as $$k_p = 2\Omega_\omega\ k_i = \Omega_\omega^2 \quad (22)$$

In addition to the position estimation, an additional and supplementary adaptation loop for the DC-link voltage estimation can be designed. Let $\phi_v$ be a DC-link voltage error projection vector and $\in_v$ an error signal is given as $$\in_v = \phi_v^T(\lambda_{dq} - \lambda_{dq}^i). \tag{23}$$

To decouple the DC-link voltage estimation and the position estimation loops, an orthogonal projection vector to the position error projection vector is considered, i.e., $$\phi_v^T \phi_\theta = 0. \tag{24}$$

Also, a unitary open-loop dc-gain of the DC-link voltage estimation loop is desired, i.e., $$\phi_v^T h_{\tilde{v}}|_{s=0} = 1. \tag{25}$$

From the preceding two conditions, the DC-link voltage error projection vector of nature is given by $$\phi_v^T = -\frac{\omega \hat{v}_{dq}^T \lambda_{dq}^a}{|\hat{v}_{dq}|^2} \phi_\theta^T J \tag{26}$$

Finally, a DC-link voltage adaptation law is defined as $$\hat{v}_{dc} = v_{dc,n} + v_{dc,n} \cdot \int k_v \in_v dt \tag{27}$$

where $k_v$ is an integral gain.

The controller 100 of the present disclosure estimates the rotor position without any position sensor, thereby resulting in numerous advantages, for example, reduced hardware complexity and lower cost, reduced size of drive machine, elimination of sensor cable, better noise immunity, and less maintenance requirements. Further, since the controller 100 estimates the rotor position independent of the DC-link voltage measurement error, the controller 100 yields an accurate and reliable estimate of the of the rotor position.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling an electric motor powered by a DC voltage using a Voltage Source Inverter (VSI), comprising:
   a feedback controller configured to generate a reference voltage vector for the electric motor;
   a modulator configured to generate duty cycles based on a DC link voltage to modulate the DC voltage according to the reference voltage vector such that a modulated voltage powering the electric motor reduces an error between a reference value of a state of an operation of the electric motor and a corresponding estimated value of the state of operation of the electric motor;
   a hybrid flux observer configured to estimate a flux error vector based on a difference between a first stator flux linkage observed according to a voltage model based on the reference voltage vector and a second stator flux linkage determined according to a current-flux model of the electric motor;
   a position observer configured to estimate a position of a rotor of the electric motor based on a projection of the flux error vector in a direction orthogonal to a direction of a voltage error vector shifted with a phase of dynamics of the hybrid flux observer; and
   a state estimator configured to estimate the value of the state of operation of the electric motor based on the estimated position of the rotor, thereby closing a feedback control loop of the feedback controller, wherein the state estimator is further configured to estimate the value of the state of operation of the electric motor using a phase-locked loop tracking the position of the rotor.

2. The controller of claim 1, further comprising:
   a DC-link voltage observer configured to estimate a DC-link voltage based on a projection of the flux error vector in a direction of the voltage error vector shifted with the phase of dynamics of the hybrid flux observer.

3. The controller of claim 2, wherein the modulator is further configured to generate the duty cycles based on the reference voltage vector and the estimated DC-link voltage.

4. The controller of claim 1, wherein the dynamics of the hybrid flux observer is represented as an equivalent high-pass filter action on the first stator flux linkage.

5. The controller of claim 1, wherein the voltage error vector is phase shifted based on a hybrid flux observer feedback gain and an estimated operating speed.

6. The controller of claim 1, wherein the estimated value of the state of operation of the electric motor includes one or a combination of a speed of the electric motor, the position of the rotor, a torque of the electric motor, and a current of the electric motor.

7. The controller of claim 1, wherein the feedback controller is a proportional-integral (PI) controller.

8. The controller of claim 7, wherein the PI controller includes a cascaded structure controlling one or a combination of the speed of the electric motor, the current of the electric motor, and the torque of the electric motor.

9. The controller of claim 1, wherein the first stator flux linkage, the second stator flux linkage, and the voltage error vector are transformed into coordinates of a rotor reference frame.

10. A method for controlling an electric motor powered by a DC voltage using a Voltage Source Inverter (VSI), comprising:
generating a reference voltage vector for the electric motor;
generating duty cycles based on a DC link voltage to modulate the DC voltage according to the reference voltage vector such that a modulated voltage powering the electric motor reduces an error between a reference value of a state of an operation of the electric motor and a corresponding estimated value of the state of operation of the electric motor;
estimating a flux error vector based on a difference between a first stator flux linkage observed according to a voltage model based on the reference voltage vector and a second stator flux linkage determined according to a current-flux model of the electric motor;
estimating a position of a rotor of the electric motor based on a projection of the flux error vector in a direction orthogonal to a direction of a voltage error vector shifted with a phase of dynamics of the hybrid flux observer;
estimating the value of the state of operation of the electric motor based on the estimated position of the rotor, wherein the dynamics of the hybrid flux observer is represented as an equivalent high-pass filter action on the first stator flux linkage.

11. The method of claim 10, further comprising estimating a DC-link voltage based on a projection of the flux error vector in a direction of the voltage error vector shifted with the phase of dynamics of the hybrid flux observer.

12. The method of claim 11, wherein the method further comprises generating the duty cycles based on the reference voltage vector and the estimated DC-link voltage.

13. The method of claim 10, wherein the voltage error vector is phase shifted based on a hybrid flux observer feedback gain and an estimated operating speed.

14. The method of claim 10, wherein the method further comprises estimating the value of the state of operation of the electric motor using a phase-locked loop tracking the position of the rotor.

15. The method of claim 10, wherein the estimated value of the state of operation of the electric motor includes one or a combination of a speed of the electric motor, the position of the rotor, a torque of the electric motor, and a current of the electric motor.

16. The method of claim 10, wherein the first stator flux linkage, the second stator flux linkage, and the voltage error vector are transformed into coordinates of a rotor reference frame.

17. A non-transitory computer-readable storage medium embodied thereon a program executable by a processor for performing a method for controlling an electric motor powered by a DC voltage using a Voltage Source Inverter (VSI), the method comprising:
generating a reference voltage vector for the electric motor;
generating duty cycles based on a DC link voltage to modulate the DC voltage according to the reference voltage vector such that a modulated voltage powering the electric motor reduces an error between a reference value of a state of an operation of the electric motor and a corresponding estimated value of the state of operation of the electric motor;
estimating a flux error vector based on a difference between a first stator flux linkage observed according to a voltage model based on the reference voltage vector and a second stator flux linkage determined according to a current-flux model of the electric motor;
estimating a position of a rotor of the electric motor based on a projection of the flux error vector in a direction orthogonal to a direction of a voltage error vector shifted with a phase of dynamics of the hybrid flux observer; and
estimating the value of the state of operation of the electric motor based on the estimated position of the rotor; and
estimating a DC-link voltage based on a projection of the flux error vector in a direction of the voltage error vector shifted with the phase of dynamics of the hybrid flux observer.

* * * * *